(12) United States Patent
Lehmusvaara et al.

(10) Patent No.: US 6,264,360 B1
(45) Date of Patent: Jul. 24, 2001

(54) MIXER FOR CONTAINER WITH QUICK RELEASE COUPLING

(75) Inventors: Taisto Lehmusvaara, Lohja; Lars Mattsson, Sammatti; Simo Rantanen, Routio; Jyrki Kukkonen, Perttula; Jouko Haavisto, Ylöpirtti, all of (FI)

(73) Assignee: Mamec Oy, Hormajärvi (FI)

( * ) Notice: Subject to any disclaimer, the term of this patent is extended or adjusted under 35 U.S.C. 154(b) by 0 days.

(21) Appl. No.: 09/380,799

(22) PCT Filed: Mar. 11, 1998

(86) PCT No.: PCT/FI98/00211

§ 371 Date: Sep. 9, 1999

§ 102(e) Date: Sep. 9, 1999

(87) PCT Pub. No.: WO98/40157

PCT Pub. Date: Sep. 17, 1998

(30) Foreign Application Priority Data

Mar. 12, 1997 (FI) ........................................................ 971022

(51) Int. Cl.[7] ........................................................ B01F 7/16
(52) U.S. Cl. ........................ 366/331; 266/262; 403/320; 403/349; 403/DIG. 4; 464/182
(58) Field of Search ........................ 366/64–66, 242–251, 366/262–265, 270, 279, 308, 330.1, 331; 464/88, 179, 182; 416/174; 703/221–223, 320, 349, 374.1, 374.5, DIG. 4

(56) References Cited

U.S. PATENT DOCUMENTS

| | | | |
|---|---|---|---|
| 1,467,820 | * | 9/1923 | Trust et al. . |
| 2,144,715 | * | 1/1939 | Dalzell et al. . |
| 2,151,146 | * | 3/1939 | Petry . |
| 2,166,376 | * | 7/1939 | Saurer . |
| 2,565,770 | * | 8/1951 | Johnson . |
| 2,630,303 | * | 3/1953 | Krucker . |
| 2,787,449 | * | 4/1957 | McElroy . |
| 2,833,576 | * | 5/1958 | Cirone . |
| 2,852,238 | * | 9/1958 | Varkony . |
| 2,911,240 | * | 11/1959 | Boutros et al. . |
| 2,945,711 | * | 7/1960 | Dykman . |
| 2,994,213 | * | 8/1961 | Arnold et al. . |
| 3,149,888 | * | 9/1964 | Lennon . |
| 3,166,330 | * | 1/1965 | Boutros . |
| 3,195,934 | * | 7/1965 | Parrish . |
| 3,297,309 | * | 1/1967 | Adams . |
| 3,606,260 | * | 9/1971 | Rubin . |
| 3,628,352 | * | 12/1971 | Stuemky . |
| 3,702,545 | * | 11/1972 | Schlotmann et al. . |
| 3,779,038 | * | 12/1973 | Stuemky . |

(List continued on next page.)

FOREIGN PATENT DOCUMENTS

| | | | | |
|---|---|---|---|---|
| 216294 | * | 7/1961 | (AT) | ...................................... 366/331 |
| 26001 | * | 12/1956 | (DE) | ...................................... 366/331 |
| 4013968 | | 11/1991 | (DE) . | |
| 2557473 | | 7/1985 | (FR) . | |

*Primary Examiner*—Charles E. Cooley
(74) *Attorney, Agent, or Firm*—Nixon & Vanderhye P.C.

(57) ABSTRACT

A container mixer typically comprises a mixer inside a container tank. The mixer comprises a shaft and blades mounted on the shaft, an actuator positioned outside the container tank, and a coupler with which the mixer is coupled to the actuator. The container tank has a quick coupling which enables the actuator to be detached temporarily from the container tank. The quick coupling comprises a separate shaft coupling piece, detachable when necessary, fitted between the actuator drive shaft and the mixer shaft in such a way that the motion of the actuator is transmitted by transmission of the shaft coupling piece to the mixer shaft. In addition the quick coupling has quick coupling and quick-release devices which lock the shaft coupling piece between the drive shaft and the mixer shaft.

21 Claims, 4 Drawing Sheets

U.S. PATENT DOCUMENTS

| | | |
|---|---|---|
| 4,063,433 | * 12/1977 | Chanton . |
| 4,198,373 | * 4/1980 | Kropp et al. . |
| 4,280,339 | * 7/1981 | Stuemky . |
| 4,312,193 | * 1/1982 | Gibbs et al. . |
| 4,596,484 | * 6/1986 | Nakatani . |
| 4,813,786 | 3/1989 | Lemaster . |
| 4,884,245 | 11/1989 | McIntosh . |
| 5,139,460 | * 8/1992 | Hoyt, III et al. ............ 464/88 |
| 5,149,194 | 9/1992 | Engels et al. . |
| 5,564,982 | * 10/1996 | Gipson et al. ............ 464/88 |
| 5,885,001 | * 3/1999 | Thomas ............ 464/182 |
| 6,076,958 | * 6/2000 | Althouse, III et al. ............ 366/331 |

\* cited by examiner

MIXER FOR CONTAINER WITH QUICK RELEASE COUPLING

CROSS REFERENCE TO RELATED APPLICATIONS

This application is a U.S. national phase of PCT/FI98/00211 filed Mar. 11, 1998.

BACKGROUND AND SUMMARY OF THE INVENTION

The present invention relates to a container mixer.

A conventional container mixer comprises a mixer proper, i.e. a shaft provided with blades or the like, placed inside a container tank, and a mixer actuator, such as an electric, hydraulic or compressed-air motor, placed outside the container tank. The mixer proper and the actuator are interconnected by coupling means.

Container mixers are used in particular for stirring liquids and other corresponding fluids in container tanks. Known container mixers are usually fastened to the tank top, but they can be fastened to the tank side or even to the bottom. Container mixers are fastened to a tank top in such a manner that the actuator of the mixer remains on the top, to which it is fastened, for example, by using a flange or a mounting plate. If the container tank has a barrel thread, the mixer can be secured directly to it with binding nuts. The mixer proper, which comprises blades or the like at the end of a long shaft, is placed in the tank in a vertical position and so as to extend from the top to the inside of the tank to a point where the mixer blades produce the desired stirring effect.

Heretofore, each container tank equipped with a fixed mixer has also had its own actuator fixedly mounted on the tank. These mixer actuators project over a considerable distance above the tank, preventing two or more container tanks from being placed one on top of another during the transportation or storage of the container tanks. If it is desired to place container tanks one on top of another for reasons of saving of space, and thus reasons of cost, for the duration of storage or transportation, it has been necessary to remove the entire mixer and to close the opening in the upper section of the tank. The removal and reinstallation of the mixer is, however, time consuming, cumbersome and often dirty work. Furthermore, the detached mixer and its actuator have to be packed separately and be transported along with the container tank, which may, of course, be inconvenient.

On the other hand, it is known that mixers are needed only when the tanks are used for storing a substance which needs to be stirred. The mixer and its motor are thus not needed, for example, when the container tank is transported empty or when transporting and storing substances which are stirred only in connection with the emptying of the tank or during the discharging of the substances. A large number of mixers and actuators are thus tied down to container tanks even when they are not needed.

It is an object of the invention therefore to provide an improvement to what has been described above. It is a particular object of the invention to provide a container mixer from which the actuator, remaining outside the container, can be easily detached separately, the stirring parts proper of the container mixer remaining in place. In this case the actuator can be detached, for example, when the contents of the container tank need not be stirred, for example, when the container tank is empty or when it is being transported or when it is used for storing substances which are not stirred all the time but only in certain conditions. An object is in this case in particular to provide a container mixer which does not prevent the container tanks from being stacked.

The container mixer according to the invention comprises between the mixer and the actuator a so-called quick coupling with which the actuator of the mixer can rapidly and easily be coupled to the mixer proper and be detached from it.

The quick coupling according to the invention typically comprises a first quick coupling part fixedly connected to the mixer shaft or an extension thereof, a so-called intershaft or the like, and a second quick coupling part fixedly connected to the actuator or a part connected thereto, such as a bearing housing or the like. The quick coupling parts can be locked to each other by quick-release means, such as CAMLOCK, claw or bayonet catches.

The first quick coupling part is typically a cylindrical sleeve or housing fitted over the mixer shaft or an extension thereof, the mixer shaft being coaxially connected to it, for example by using a groove and ball bearing or the like. Thus the mixer shaft or its extension can be rotated inside the quick coupling part.

The second quick coupling part is typically also a cylindrical sleeve or housing inside which the drive shaft of the actuator, or an extension thereof, can be rotated. The quick coupling part can be connected, for example, to the bearing housing by using a threaded coupling.

A container mixer according to the invention, equipped with a quick coupling, has additionally, mounted between the actuator drive shaft and the mixer shaft or its extension, a separate shaft coupling piece, a so-called inner shaft, which transmits the rotary motion of the drive shaft to the mixer shaft. The above-mentioned quick coupling parts lock the shaft coupling piece between them, i.e. ensure its connection with both the drive shaft and the mixer shaft and the transmission of the drive shaft motion to the mixer shaft. By the opening of the quick-release means, one quick coupling part and the actuator connected thereto and the shaft coupling piece can be detached and the connection between the drive shaft and/or the mixer shaft can be disconnected.

The first (upper) end of the shaft coupling piece, which in a preferred embodiment according to the invention is made, for example, of a hexagon bar, is in the system according to the invention preferably connected coaxially to the end of the actuator drive shaft by a coaxial sleeve interconnecting the ends. This sleeve may be of rubber or some other corresponding resilient substance, in which case the coupling between the shafts is resilient. The sleeve ends correspond on the inside both in shape and in their inner diameter to the ends of the shafts to be connected by the sleeve. The sleeve diameter is typically approx. 10–25 mm, preferably approx. 15–20 mm. For example, in the case of a hexagon shaft, that end of the sleeve which is towards this shaft is on the inside hexagonal in shape or on the inside of this end of the sleeve there is fixed a ring or a cylindrical inner piece which gives the inside of the sleeve the desired hexagonal shape. Respectively, when necessary the other end of the sleeve is advantageously shaped into the shape of the drive shaft end. Typically approximately one half of the length of the shaft coupling piece, which is approx. 40–100 mm, preferably approx. 60–85 nun, protrudes inside the sleeve. In some applications it may suffice that a smaller portion, for example one-fourth or preferably, however, at least one-third, of the length of the shaft coupling piece protrudes inside the sleeve. In order to ensure the coupling between the sleeve and the shafts, the sleeve may, when necessary, be fastened by compression bindings to the drive shaft, especially if, for example, the ends of both the sleeve and the drive shaft are round in cross section. However, in such a solution according to the invention the shaft coupling piece can be easily detached from the sleeve merely by releasing the quick coupling, i.e. by opening the quick-release means and by detaching the quick coupling parts from each other.

In a solution according to the invention, the sleeve interconnecting the drive shaft and the shaft coupling piece may, on the other hand, be made of two separate cylindrical sleeve parts which are attached to the ends of the shafts. In this case the sleeve parts may be made of metal, rubber or some other suitable material. Between the metal sleeve parts there is, however, preferably left a small annular space in which there can be fitted a resilient element in order to form a resilient coupling between the coaxially fitted shaft ends. Over the sleeve parts and the resilient element there is fitted cylindrical retainer sleeve to connect them.

In a solution according to the invention, the second (lower) end of the shaft coupling piece, for example, a hexagon shaft, is preferably connected coaxially to the end of the mixer shaft by means of a sleeve-shaped intershaft interconnecting these ends. In this case the inside of that intershaft end which faces away from the mixer shaft is preferably shaped to correspond to the shape and size of the hexagon shaft so that this end of the hexagon shaft can be fitted inside the intershaft. At the other end of the intershaft there is preferably formed a thread in order to secure to it the threaded end of the mixer shaft proper.

The structure of the quick coupling is preferably such that the shaft coupling piece with its sleeve is to be mounted at least in part in the area of the cylindrical quick coupling parts of the quick coupling, inside them, whereupon the shaft coupling piece can be easily detached from the quick coupling or be placed into the quick coupling while the quick coupling parts are detached from each other, i.e. in the open position of the quick coupling.

That edge of the quick coupling part surrounding the intershaft which faces the tank is preferably provided with a thread by means of which the quick coupling part can be fastened to the top of the container tank, to its opening provided with a thread, for example, a barrel thread.

The system according to the invention provides a container mixer from which the actuator can be easily and rapidly detached by opening the quick-release means. Thus there will be left in the upper section of the container tank no detrimentally high devices which would prevent another container tank from being placed on top of the first container tank. After transportation or storage, it is possible to connect to the container mixer the actuator detached from it or another similar actuator provided with a corresponding quick coupling part. The storage and transportation of container tanks one on top of another saves in both storage and transportation costs. When the option according to the invention is used, only the mixer parts proper are fixedly installed in the container tanks. The actuator is fastened to the container tank and coupled to the mixer therein only according to need. Thus in many cases it is possible to use one and the same actuator in turns for several container mixers, in which case all in all a smaller number of actuators are needed and savings are achieved in their acquisition costs.

The invention is described below in greater detail, with reference to the accompanying drawings.

DETAILED DESCRIPTION OF THE DRAWINGS

Figure 1:
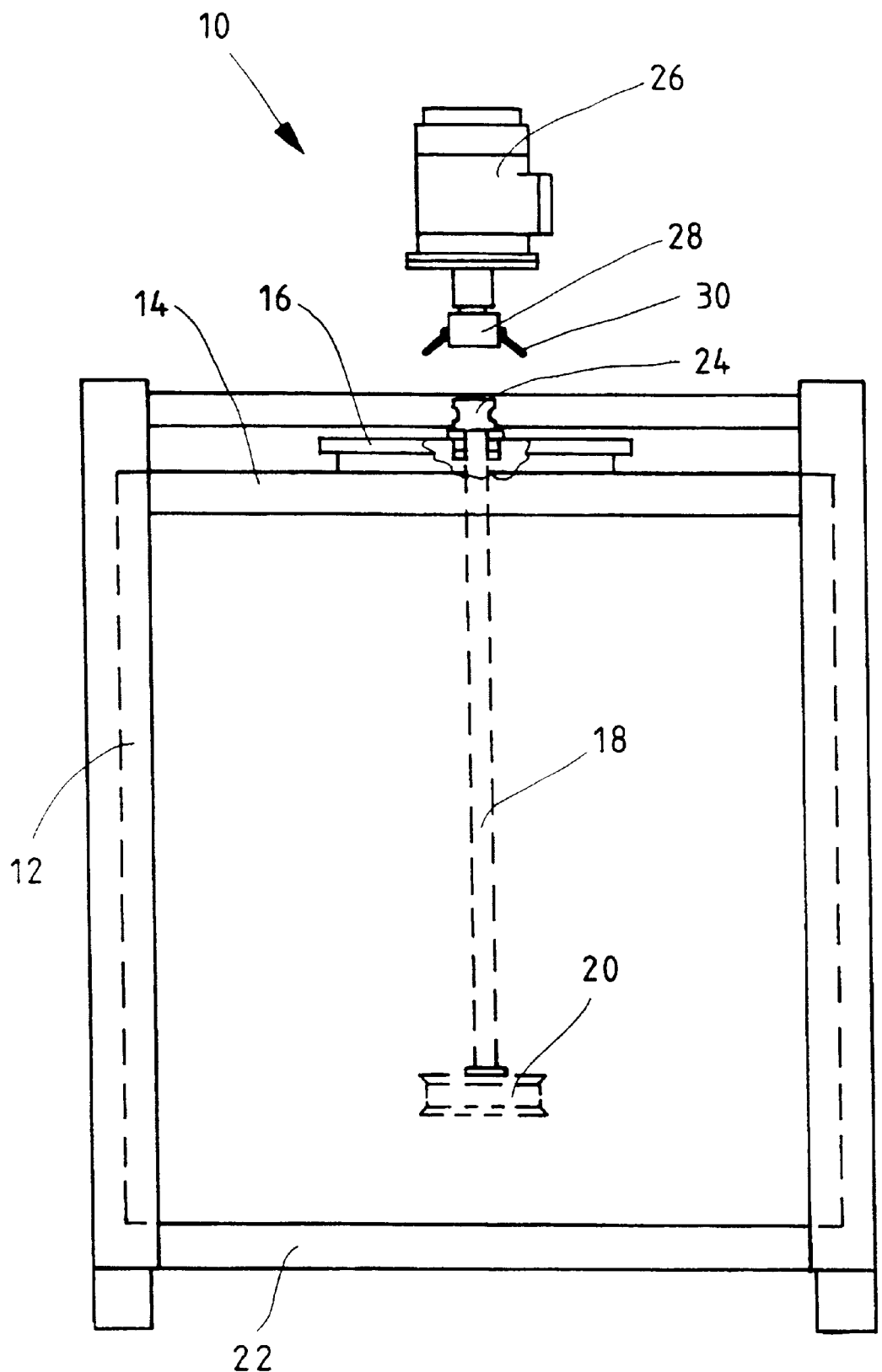
FIG. 1 depicts by way of example a side elevation of the mixer proper of a container mixer according to the invention, fitted in a container tank, and the actuator detached from it.

FIG. 1 shows a container mixer 10 according to the invention connected to a container tank 12. The container mixer 10 is connected to a flange 16 in the top 14 of the tank 12 in such a manner that the mixer shaft 18, to which there is attached an impeller 20, protrudes vertically downwards from the top 14 towards the bottom 22 of the container tank without, however, extending all the way to the bottom. The upper end of the container mixer of the figure is attached with bearings in such a manner that it need not bear on the tank bottom.

The parts of the container mixer are typically made from steel, such as acid-resistant steel, or some other material in accordance with the requirements set by the material to be stirred and the environment. The mixer parts can be coated according to the requirements.

Above the top of the container tank 12 there is seen, attached to the mixer shaft, the first quick coupling part 24 of the quick coupling, by means of which part the actuator 26, detached from the mixer and shown above the container tank, can be connected to the mixer. The actuator 26 has the second quick coupling part 28 of the quick coupling, and this part can, by using quick-release means 30, be rapidly locked to the first quick coupling part 24. The actuator used for the container mixer is, for example, an electric, hydraulic or compressed-air motor, or some other suitable actuator.

Figure 2:
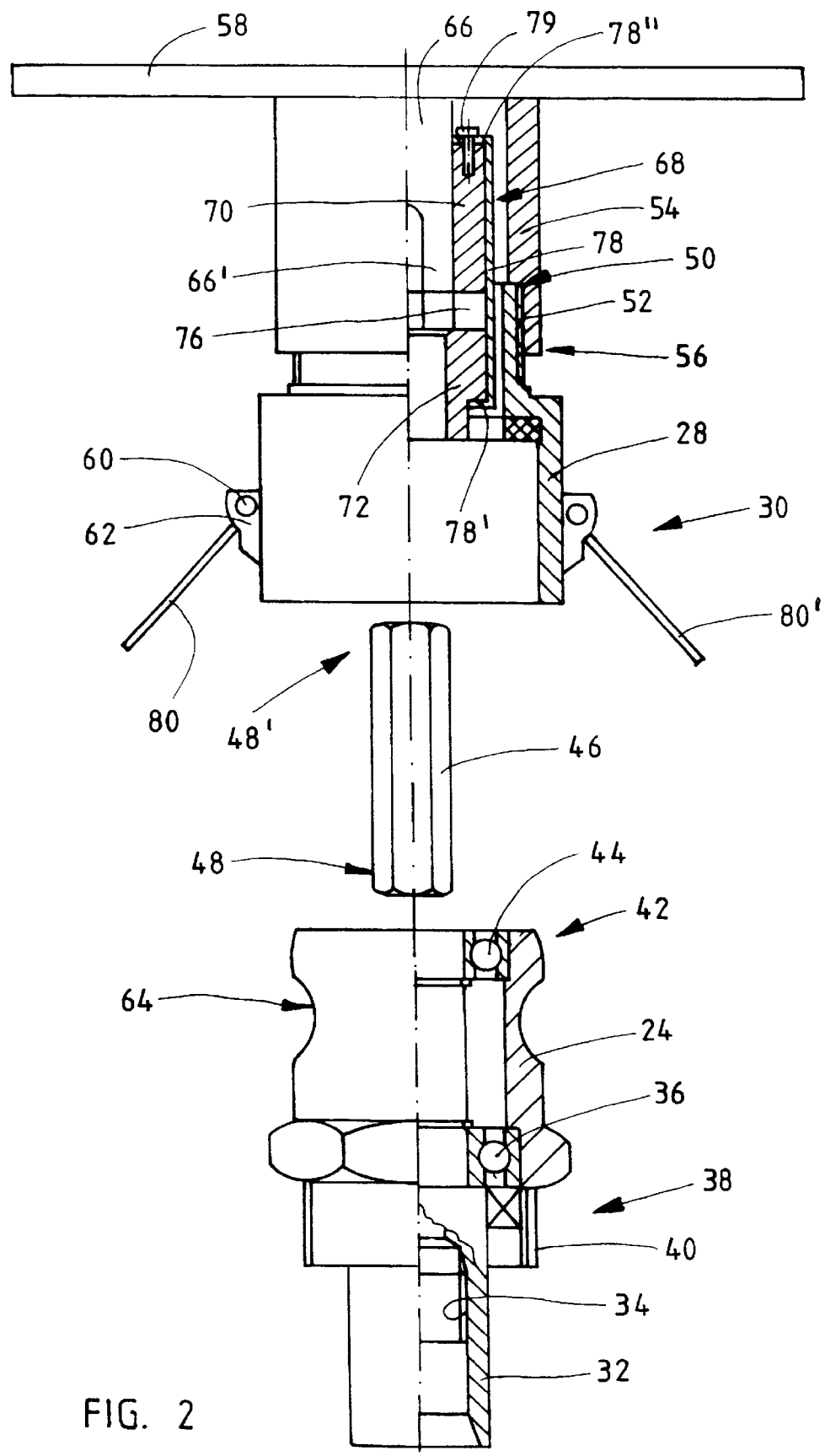
FIG. 2 depicts schematically a side elevation, partly in section, of the coupling means of one container mixer according to the invention, the quick coupling being in the non-locked position.
Figure 3:
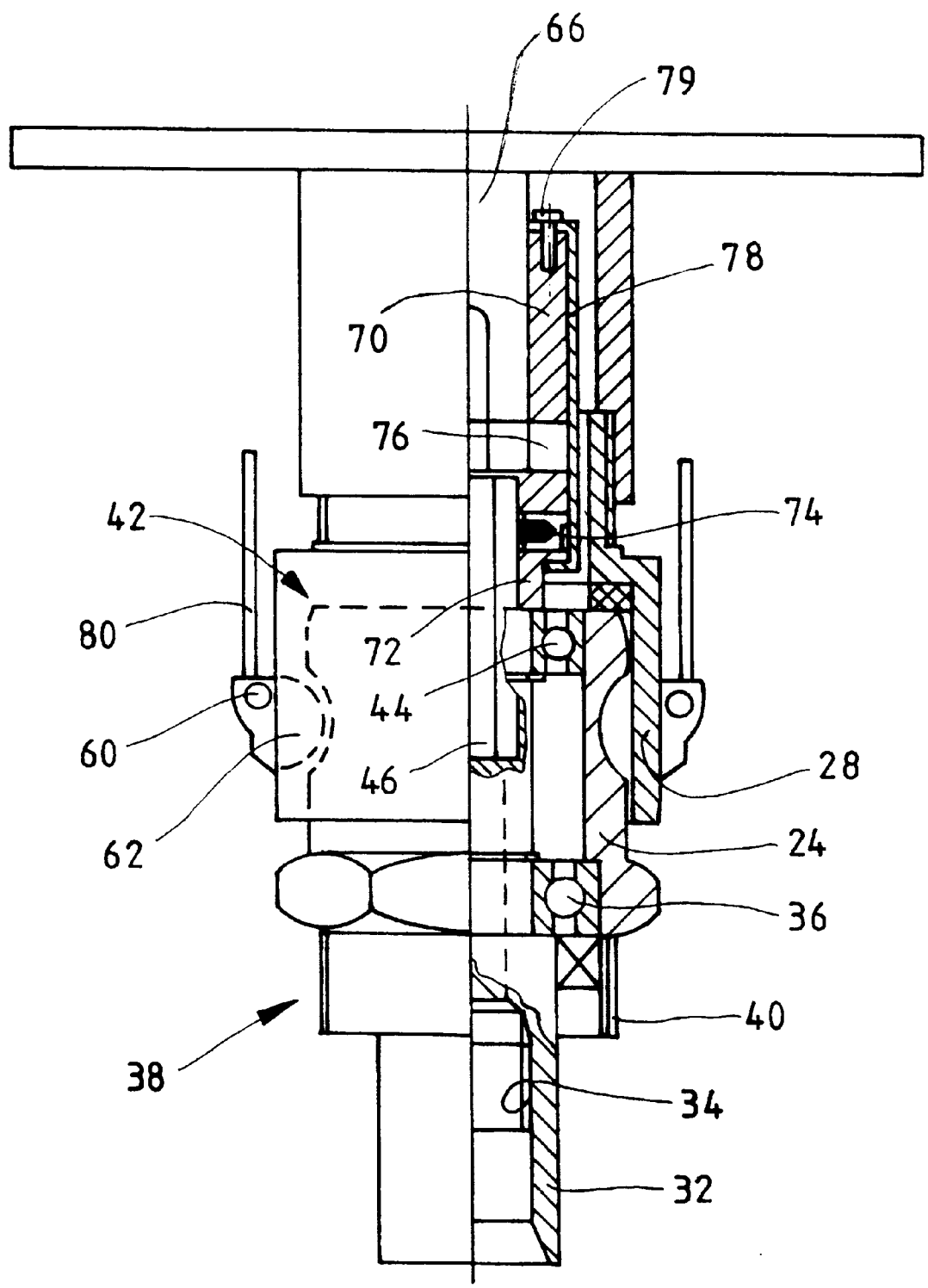
FIG. 3 depicts the coupling means according to FIG. 2, the quick coupling being locked.

FIGS. 2 and 3, in which there are used, where applicable, the same reference numerals as in FIG. 1, show as a blow-up and schematically the quick coupling of one container mixer according to the invention, with the quick coupling in the non-locked position (FIG. 2) and in the locked position (FIG. 3). The quick coupling comprises a first cylindrical quick coupling part 24 in contact with the mixer shaft and a second quick coupling part 28, which is connected to the actuator 26 (cf. FIG. 1). The quick coupling parts 24 and 28 are typically substantially cylindrical pieces approx. 40–70 mm high. The outer diameter of one quick coupling part is smaller than the corresponding inner diameter of the other, so that the quick coupling parts can be placed coaxially at least in part one inside the other.

The first quick coupling part 24 is connected to an intershaft 32, which in turn is connected by a thread 34 to the mixer shaft 18 (cf. FIG. 1). The intershaft 32 is attached by means of a groove and ball bearing 36 inside the quick coupling part 24. The lower rim 38 of the quick coupling part 24 is provided with a thread 40 by means of which the quick coupling part 24 can be attached to a threaded opening in the container tank top 14 (cf. FIG. 1) in such a manner that the mixer parts proper of the mixer, i.e. the shaft 18 and its impeller 20 or the like, are vertically positioned inside the tank and the quick coupling part 24 is on the outside of the tank. At the upper rim 42 of the quick coupling part there is fitted a second groove and ball bearing 44 to accommodate one end 48 of the shaft coupling piece 46 (FIG. 3). The other end of the shaft coupling piece 46 is detachably connected to the actuator shaft, as is described below.

The quick coupling shown in FIGS. 2 and 3 comprises, additionally, a second cylindrical quick coupling part 28, which can be connected coaxially to the first quick coupling part 24 in such a manner that approximately one-half of the length of the second part 28 pushes over the first part 24 (FIG. 3). The shaft coupling piece 46 can thus be locked between the quick coupling parts.

The upper rim 50 of the quick coupling part 28 is connected by a threaded coupling 52 to the lower rim 56 of the bearing housing 54 of the mixer, the bearing housing 54 in turn being connected to an interplate 58 attached to the actuator 26 (cf. FIG. 1) in order to connect the quick coupling part 28 fixedly to the actuator.

The quick coupling part 28 additionally has so-called CAMLOCK quick-release means 30, which have cam pieces 62 which can be turned inwardly from the cylinder about a shaft 60, the cam pieces in their locking position (FIG. 3) protruding radially inwards into a counter groove 64 on the outer surface of the first quick coupling part, thus locking the quick coupling parts 24 and 28 to each other and the shaft coupling piece 46 between the actuator drive shaft 66 and the mixer shaft 18, 32.

FIGS. 2 and 3 additionally show how the shaft coupling piece 46 is connected by means of a sleeve 68 to the drive shaft 66 of the actuator 26. The sleeve 68 is made up of two successive coaxial sleeve parts 70 and 72, of which the upper sleeve part 70 is fastened over the head of the drive shaft 66. The lower sleeve part 72 does not extend all the way to the drive shaft but is at a small distance from the end of the drive shaft. The upper end of the shaft coupling piece 46 protrudes inside the lower sleeve part 72 almost all the way to the drive shaft and is fastened to it by means of a retainer screw 74, in order to transmit the motion of the drive shaft to the shaft coupling piece. Between the sleeve parts 70, 72 there is fitted a resilient element 76 in order to provide a resilient sleeve coupling between the drive shaft 66 and the shaft coupling piece 46. The sleeve parts 70, 72 are fastened to each other by means of a retainer sleeve 78 surrounding the sleeve parts, which retainer sleeve has at its ends small, radial, inwardly bent rims 78', 78", and is fastened to the upper sleeve part 70 by means of, for example, a groove screw 79 or the like, the lower sleeve part 72 remaining connected to the sleeve part 70 around the drive shaft, at a small distance from the sleeve part 70.

By using the quick coupling depicted in FIGS. 2 and 3 it is possible to detach the actuator from the mixer shaft in an instant by turning by the CAMLOCK levers 80 and 80'.

Figure 4:
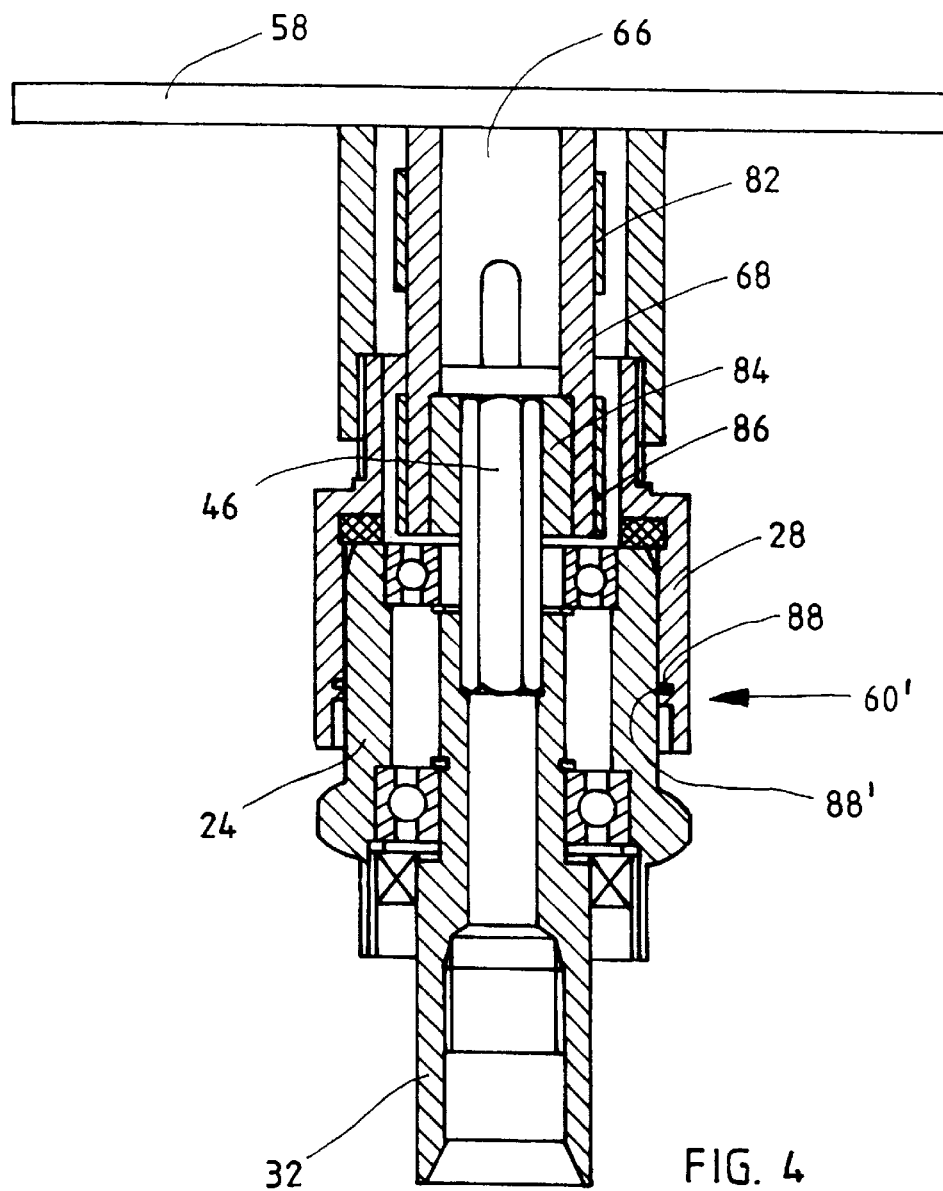
FIG. 4 depicts schematically a vertical section of the coupling means of another container mixer according to the invention.
Figure 5:
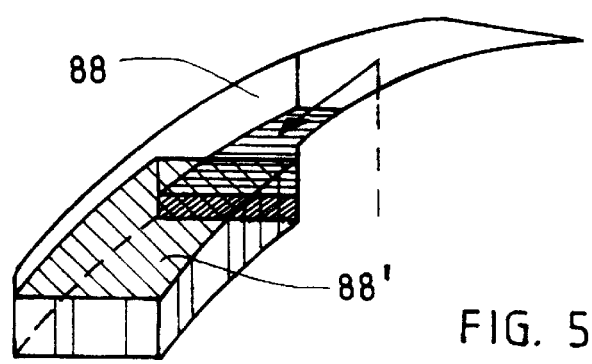
FIG. 5 depicts schematically the quick-release means depicted in FIG. 4, as a blow-up.

FIG. 4 depicts a slightly different quick coupling, which has quick coupling parts 24 and 28 as does the option depicted in FIGS. 2 and 3. In the option of FIG. 4, however, in a manner deviating from the option of FIGS. 2 and 3, there is fitted over the head of the drive shaft 66 a continuous sleeve 68 made of a resilient material, such as rubber. The sleeve 68 is locked by a compression band 82 over the drive shaft 66 head below the actuator mounting flange 58. The sleeve 68 extends over the head of the drive shaft 66 so that at least one-fourth, preferably approx. one-half or more, of the length of the shaft coupling piece 46 can be pushed inside the sleeve in order to transmit the drive shaft motion to the shaft coupling piece, which in the case depicted in the figure is a hexagon shaft 46. The inner surface of the sleeve could according to the invention be given the shape of the hexagon shaft, but in the case depicted in the figure the shape of the inside of the sleeve has been produced by using a separate inner sleeve 84 fitted inside the sleeve. Furthermore, outside the sleeve there is fitted a compression band 86 to ensure that the inner sleeve 84 will remain inside the sleeve 68.

In the case of FIG. 4, the coupling between the shaft coupling piece and the intershaft in contact with the mixer shaft is the same as in the case depicted in FIGS. 2 and 3.

FIG. 4, however, depicts a different quick-release locking of the quick coupling. The quick coupling parts 24 and 28 are in this case interconnected by a so-called bayonet or claw joint 60', known per se, in which in one quick coupling part there is fitted a groove 88 and in the other a mating projection 88', which, when the quick coupling parts are turned relative to each other, can be caused to lock the parts 24, 28 to each other and, respectively, to detach them from each other.

It can be deemed to be an important advantage of the invention that, even though the lower and upper parts of the mixer, i.e. the mixer part proper and the actuator part, can be coupled to each other, e.g. by the CAMLOCK or bayonet catches mentioned, without leeway and without tools, the actuator can, nevertheless, be very easily and rapidly detached from the mixer part proper, in general with no tools other than working gloves.

Furthermore, the various coupling structures according to the invention enable the driving torque of the actuator to be transmitted to the mixer shaft without causing a bending vibration impulse. This is achieved according to the invention, for example, by the actuator shaft and the gear system in the tank being precisely coaxially positioned. On the other hand, also by the structure being strongly resilient and allowing shaft centricity errors.

The mixer structure according to the invention need not necessarily be made to bear on the tank bottom by using a so-called bottom bearing, since the two-bearing solution shown in the figures, or one wide bearing at a corresponding point, is capable of receiving any possible bending moment.

Above, two embodiments of the invention have been described by way of example. It is not the intention to limit the invention to these embodiment examples; by contrast, the intention is to use it widely within the inventional idea defined in the patent claims presented below.

What is claimed is:

1. A container mixer comprising:
   a container tank having an inside;
   a mixer having a shaft connected to at least one stirring implement, said mixer disposed within said container tank;
   a mixer actuator positioned outside said container tank and including an actuator drive shaft; and
   a coupler operably connecting said actuator and said mixer shaft, said coupler comprising:
      a first quick coupling part operatively connected to said mixer shaft;
      a second quick coupling part operatively connected to said actuator shaft;
      quick release means for directly detachably locking said first and said second quick coupling parts together;
      a shaft coupling piece which transmits the rotary motion of said actuator drive shaft to said mixer shaft; and a sleeve at least partly made of resilient material forming a resilient coaxial coupling between said actuator drive shaft and said shaft coupling piece.

2. A container mixer as recited in claim 1 wherein said shaft coupling piece comprises a separate shaft element locked between said first and second quick coupling parts when said first and second quick coupling parts are locked together.

3. A container mixer as recited in claim 2 wherein said sleeve is made of rubber.

4. A container mixer as recited in claim 2 wherein said sleeve comprises a first sleeve part fitted over said actuator drive shaft, and a second sleeve part fitted over an end of said shaft coupling piece, and a retainer sleeve interconnecting said first and second sleeve parts.

5. A container mixer as recited in claim 4 further comprising a resilient element fitted between said first and second sleeve parts.

6. A container mixer as recited in claim 1 wherein said sleeve comprises a first sleeve part fitted over said actuator drive shaft, and a second sleeve part fitted over an end of said shaft coupling piece, and a retainer sleeve interconnecting said first and second sleeve parts.

7. A container mixer as recited in claim 6 further comprising a resilient element fitted between said first and second sleeve parts.

8. A container mixer as recited in claim 1 further comprising a sleeve-shaped intershaft interconnecting adjacent ends of said shaft coupling piece and said mixer shaft.

9. A container mixer as recited in claim 8 wherein said first quick coupling part comprises a substantially cylindrical first mantle which is coaxially fastened over said intershaft; and further comprising a groove and ball bearings fitted between said intershaft and said first mantle which allow said intershaft to rotate inside said first mantle.

10. A container mixer as recited in claim 9 wherein said first mantle comprises a rim having a screw thread; and wherein said container tank comprises an opening having screw threading corresponding to said screw threading of said first mantle rim; and wherein said screw threading of said first mantle rim engages said screw threading of said opening in said container tank so as to fasten said first mantle to said container tank.

11. A container mixer as recited in claim 9 wherein said second quick coupling part comprises a substantially cylindrical second mantle; and a threaded coupling having at least one rim; and a cylindrical bearing housing having at least one rim surrounding said actuator drive shaft; said second mantle fastened by a rim of said threaded coupling to said rim of said cylindrical bearing housing.

12. A container mixer as recited in claim 1 wherein said second quick coupling part comprises a substantially cylindrical second mantle; and a threaded coupling having at least one rim; and a cylindrical bearing housing having at least one rim surrounding said actuator drive shaft; said second mantle fastened by a rim of said threaded coupling to said rim of said cylindrical bearing housing.

13. A container mixer as recited in claim 1 wherein said first and second quick coupling parts each comprise a substantially cylindrical mantle part, said mantle parts fitted coaxially around said shaft coupling piece.

14. A container mixer as recited in claim 1 wherein said quick release means comprises claw or bayonet catches.

15. A container mixer comprising:
a container tank having an inside;
a mixer having a shaft connected to at least one stirring implement, said mixer disposed within said container tank;
a mixer actuator positioned outside said container tank and including an actuator drive shaft; and a coupler operably connecting said actuator and said mixer shaft, said coupler comprising:
a first quick coupling part operatively connected to said mixer shaft;
a second quick coupling part operatively connected to said actuator shaft;
a quick release device which directly detachably locks said first and said second quick coupling parts to each other;
a shaft coupling piece which transmits the rotary motion of said actuator drive shaft to said mixer shaft; and
a sleeve at least partly made of resilient material forming a resilient coaxial coupling between said actuator drive shaft and said shaft coupling piece.

16. A container mixer as recited in claim 15 wherein said shaft coupling piece comprises a separate shaft element locked between said first and second quick coupling parts when said first and second quick coupling parts are locked together.

17. A container mixer as recited in claim 16 wherein said sleeve comprises a first sleeve part fitted over said actuator drive shaft, and a second sleeve part fitted over an end of said shaft coupling piece, and a retainer sleeve interconnecting said first and second sleeve parts.

18. A container mixer as recited in claim 17 further comprising a resilient element fitted between said first and second sleeve parts.

19. A container mixer as recited in claim 15 further comprising a sleeve-shaped intershaft interconnecting adjacent ends of said shaft coupling piece and said mixer shaft and wherein said first quick coupling part comprises a substantially cylindrical first mantle which is coaxially fastened over said intershaft; and further comprising a groove and ball bearings fitted between said intershaft and said first mantle which allow said intershaft to rotate inside said first mantle.

20. A mixing assembly comprising:
a mixer shaft having at least one stirrer implement connected thereto;
a mixer actuator and a drive shaft for said actuator;
a coupler operably connecting said actuator and said mixer shaft, said coupler comprising:
a first quick coupling part operatively connected to said mixer shaft;
a second quick coupling part operatively connected to said actuator shaft;
a quick release device which directly detachably locks said first and said second quick coupling parts to each other;
a shaft coupling piece which transmits the rotary motion of said actuator drive shaft to said mixer shaft, and wherein said shaft coupling piece comprises a separate piece which is locked between said first and second quick coupling parts when said quick coupling parts are locked together; and
a sleeve at least partly made of resilient material forming a resilient coaxial coupling between said actuator drive shaft and said shaft coupling piece.

21. A container mixer comprising:
a container tank having an inside;
a mixer having a shaft connected to at least one stirring implement, said mixer disposed within said container tank;
a mixer actuator positioned outside said container tank and including an actuator drive shaft; and
a coupler operably connecting said actuator and said mixer shaft, said coupler comprising:

a first quick coupling part operatively connected to said mixer shaft;

a second quick coupling part operatively connected to said actuator shaft;

a quick release device which detachably locks said first and said second quick coupling parts to each other;

a shaft coupling piece which transmits the rotary motion of said actuator drive shaft to said mixer shaft; and a sleeve at least partly made of resilient material forming a resilient coaxial coupling between said actuator drive shaft and said shaft coupling piece, wherein the container mixer further comprises a sleeve-shaped intershaft interconnecting adjacent ends of said shaft coupling piece and said mixer shaft.

* * * * *